May 22, 1956   J. V. CAPUTO ET AL   2,747,155
WELDING GENERATOR CONTROL APPARATUS
Original Filed Oct. 16, 1947   4 Sheets-Sheet 1
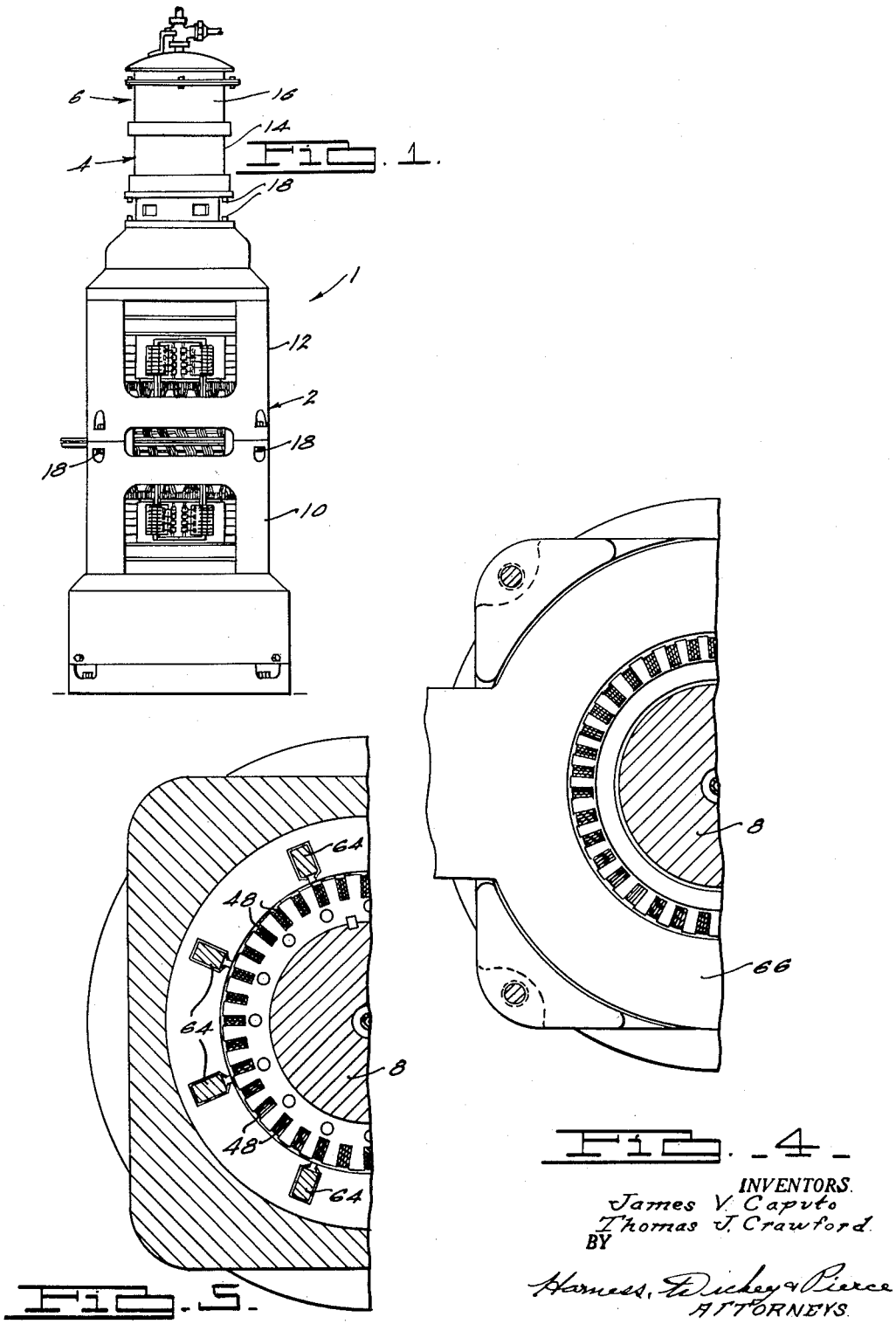
INVENTORS.
James V. Caputo
Thomas J. Crawford
BY
Harness, Dickey & Pierce
ATTORNEYS

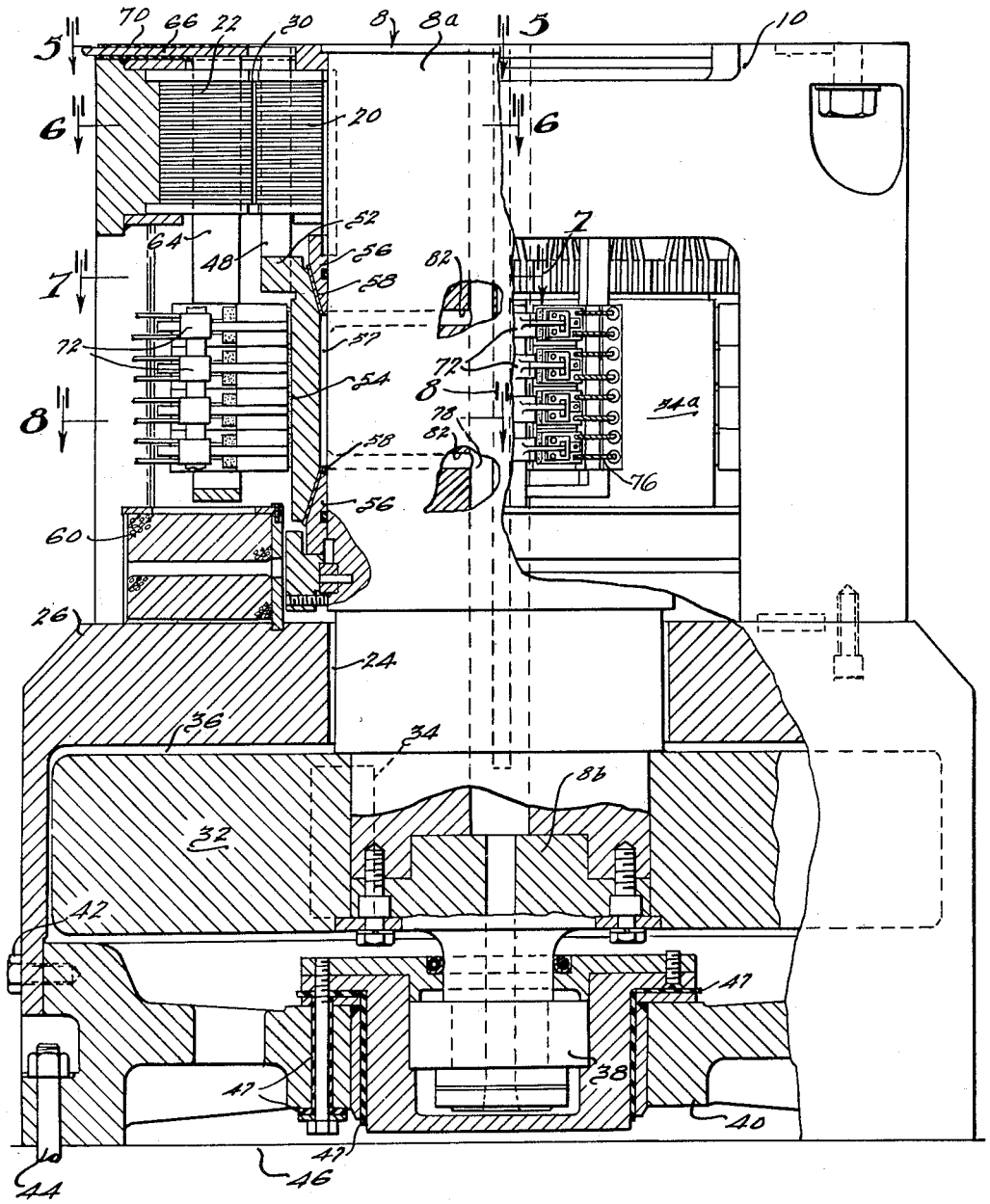

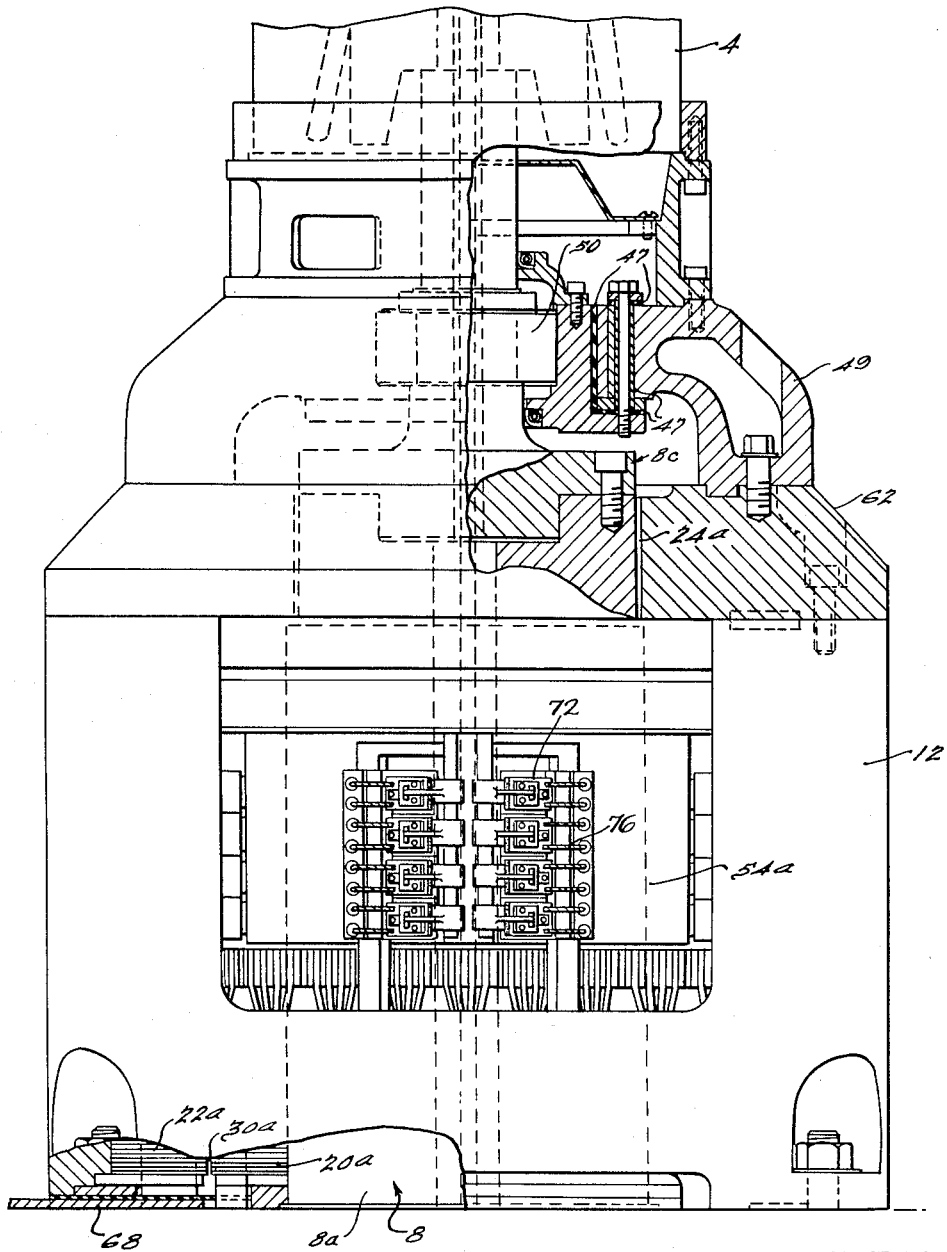

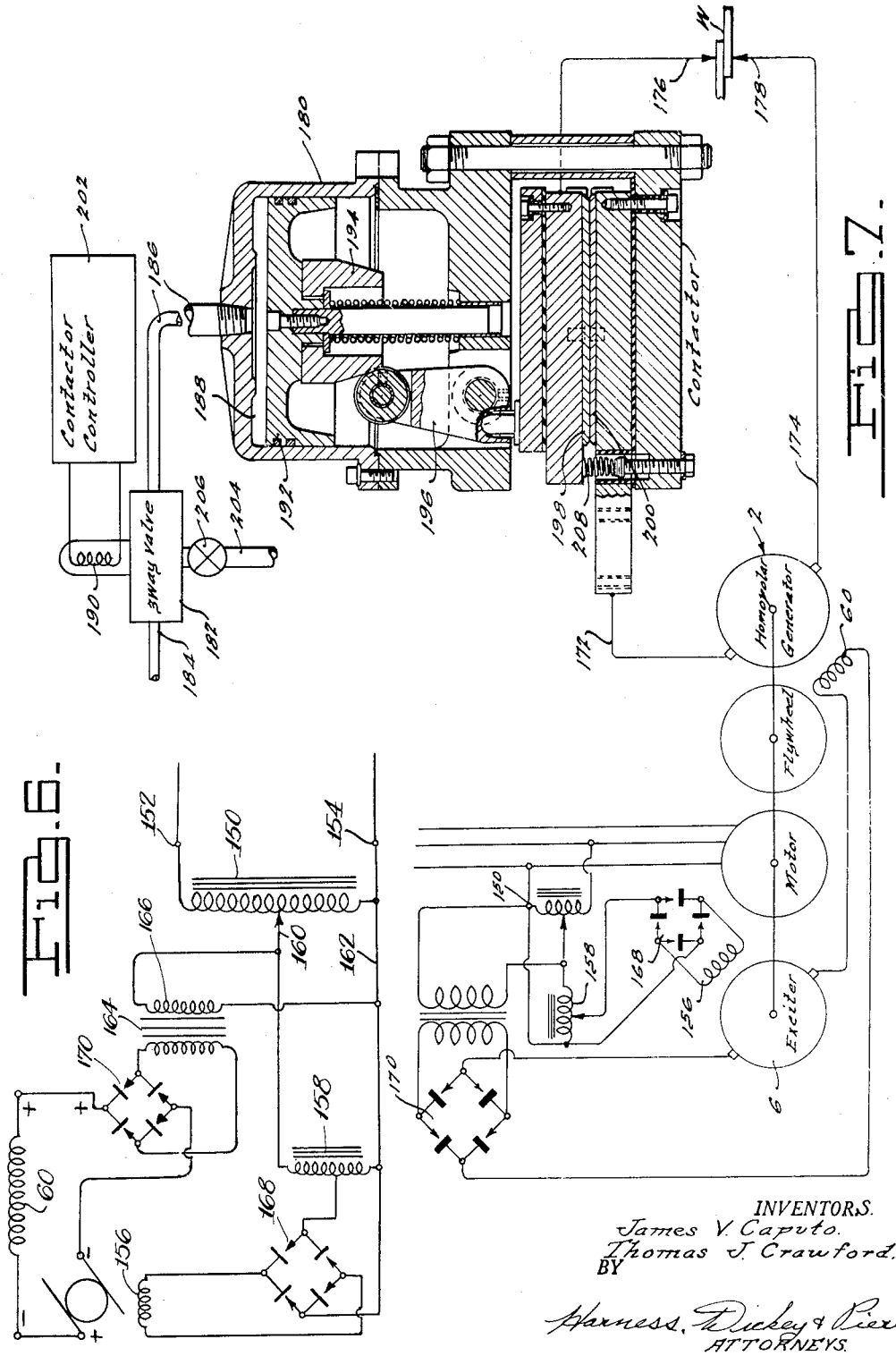

United States Patent Office 2,747,155
Patented May 22, 1956

2,747,155
WELDING GENERATOR CONTROL APPARATUS

James V. Caputo, Youngstown, Ohio, and Thomas J. Crawford, Berkley, Mich.; said Crawford assignor to said Caputo Original application October 16, 1947, Serial No. 780,170, now Patent No. 2,600,844, dated June 17, 1952. Divided and this application October 22, 1951, Serial No. 252,551

11 Claims. (Cl. 322—4)

The present invention relates to rotating electrical apparatus and more specifically to an electric dynamo which is adapted, among other uses, for the supplying of heavy pulses of current for relatively short intervals for a spot, projection, or flash-type electric resistance welding and is a division of our copending application, Serial No. 780,170, filed October 16, 1947, now Patent No. 2,600,844, for Electrical Apparatus. Other features shown but not claimed herein are shown and claimed in our copending application Serial No. 230,152, filed June 6, 1951, and application Serial No. 252,552, filed October 22, 1951, now Patent No. 2,640,942.

The principal objects of the present invention are: to provide an improved electrical current generating apparatus of the character described; to provide a new and improved energy storage and conversion apparatus; to provide an improved energy storage dynamoelectric machine having a flywheel for energy storage; to provide an improved exciting control system for such an electric machine; to provide such an exciting system in which the output voltage is relatively independent of changes of speed of rotation of the machine; to provide such an exciting system in which greater utilization may be had of the energy stored in the flywheel and other rotating parts of the generating apparatus; and generally to provide a new and improved electric power-generating apparatus for use in welding systems.

Other and more detailed objects of the invention will appear in the following description and in the appended claims.

In the accompanying drawings, which illustrate preferred embodiments of the invention and throughout the several views of which corresponding reference characters are used to designate corresponding parts:

Figure 1 is a view in elevation of a motor-generator unit embodying the invention;

Fig. 2 is a view of the lower portion of the homopolar generator shown partly in central vertical section, the sections being taken along various radial lines to best illustrate the various constructional features thereof;

Fig. 3 is a view of the upper portion of the generator with certain parts shown in radial section to illustrate certain constructional features thereof;

Fig. 4 is a view taken substantially along the line 5—5 of Fig. 2;

Fig. 5 is a partial view taken substantially along the line 6—6 of Fig. 2;

Fig. 6 is a schematic electrical diagram showing the exciting circuit for the homopolar motor generator;

Fig. 7 is a schematic view of a welding system embodying the invention.

It will be appreciated from a complete understanding of the present invention that the improvements thereof may be embodied in apparatus of widely varying capacities and intended for widely different types of service; that in certain of their broader aspects many features of the present complete system may be utilized independently of other features and that the present improvements may be embodied in widely differing structural forms. The present disclosure, therefore, of a particular structural embodiment is to be regarded in an illustrative and not in a limiting sense.

Referring first to Fig. 1, the motor generator combination 1 comprises a homopolar generator portion 2, a motor driving portion 4, and an exciter 6 arranged in concentric fashion one above the other in a single casing and the rotors of which are all secured together upon a common shaft 8. The single casing for the motor generator unit comprises a series of casing sections 10, 12, 14, and 16 which are suitably bolted together as by means of bolts 18.

The homopolar generator 2 comprises essentially two complementary similar halves, one of which is housed within the casing 10 and the other of which is housed within the casing 12 in generally the same manner as is disclosed and claimed in J. V. Caputo Patent No. 2,005,609, dated June 18, 1935.

In the present construction a laminated core 20 is provided on the shaft 8 for rotation therewith and is aligned with a laminated field structure 22 held rigid with the lower casing section 10. In the said Caputo patent, flux flows longitudinally of the rotating shaft through a series of laminated core structures arranged longitudinally of the shaft; however, in the present application, flux flows directly into the shaft and longitudinally therethrough to the lower end portion, some of the flux returning to the lower casing section 10 across an air gap 24 into an annular platelike portion 26 of the section 10 and then upwardly through legs 28 of the casing section 10 back to the laminated field structure 22 and across an air gap 30 back to the laminated core 20. Other of the flux passing downwardly longitudinally through the shaft 8 flows outwardly through a flywheel 32 which is keyed by means of key 34 to the lower end of the shaft 8 through an air gap 36 to the annular platelike portion 26 and then returns to the laminated core in the manner above described in connection with the flux which passes across the air gap 24.

By properly proportioning the length of the air gaps 24 and 36, the flux made to pass across the gap 36 may be proportioned so that substantially the entire weight of the flywheel 32 may be supported due to the attractive effect of the flux passing across the gap 36. If desired, the gaps 36 and 24 may be so proportioned that not only the weight of the flywheel 32 is supported by flux passing across the gap 36 but also the weight of the other parts carried by the shaft 8 so that the end thrust during operation of the motor generator 1 may be relieved from the lower bearing 38 thereof. The lower bearing 38 for the shaft section 8b is preferably carried by a lower end bell 40 of the casing section 10 which is secured thereto as by stud screws 42. Bolts 44 may extend through other apertures in the bell 40 whereby the motor generator 1 may be secured to a suitable footing 46. The end bell 40 is preferably made of non-magnetic material such as stainless steel or aluminum bronze and is electrically insulated from the bearing 38 by suitable insulation 47. Similarly an upper end bell 49 of nonmagnetic material carries an upper bearing 50 for the shaft section 8c, the bearing 50 being electrically insulated from the bell 49 by insulation 47.

The upper portion of the homopolar generator 2 located within the casing section 12 is similar to that described and comprises a laminated core 20a, a laminated field structure 22a separated by an air gap 30a so that flux from the structure 22a may flow across the gap 30a through the laminated core 20a upwardly through the shaft 8 radially outwardly across an air gap 24a and back to the laminated field structure 22a through the casing section 12. The laminated cores 20 and 20a are provided with laminated inductors 48 which are spaced circumferentially around the laminated cores 20 and 20a and extend substantially parallel to the longitudinal axis of the rotating common shaft 8. The ends of the inductors 48 are each connected to radial flanges 52, 52a of collector rings 54, 54a respectively. The rings 54 and 54a are located concentric of the shaft 8 and held for rotation therewith between wedge-shaped collars 56. Annular insulating members 58 insulate the collector ring 54 from the wedge-shaped collars 56 whereby the ring 54 is electrically insulated from the shaft 8 and spaced therefrom to provide an annular chamber 57. The collector ring 54 is located longitudinally along the shaft intermediate the core 20 and the annular platelike portion 26 while the ring 54a is similarly placed above the core 20a and below an upper horizontal magnetic platelike member 62. Suitable field windings 60 are provided on the upper surface of the annular portion 26 for inducing a flow of flux across the air gaps 24, 30, and 36 in a path as above described.

The laminated field structures 22 and 22a each are provided with longitudinally extending conductor busses 64 which are parallel with the inductors 48 and are preferably equally spaced around the structures 22 and 22a. The sets of conductor busses carried by the field structures 22 and 22a, unlike the inductors 48, are not interconnected together. All of the conductor busses 64 associated with the field structure 22 are electrically connected to an annular conducting ring 66 which serves as one output terminal of the homopolar generator 2. The conductor busses 64 associated with the field structure 22a are likewise all connected together to an annular conducting ring 68 which serves as the other output terminal of the homopolar generator 2. The rings 66 and 68 are closely adjacent one another but are insulated from one another by an annular insulating ring 70. By thus connecting the busses 64 in the disks 66 and 68, the disks become common flat conductors, and the arrangement of individual wide bars extending radially outwardly as heretofore commonly used, and shown for example in my prior Patent No. 2,018,647, is avoided, thereby simplifying construction and shortening the machine overall length, resulting in better performance and reduced manufacturing cost. The outwardly extending end portions of all of the conductor busses 64 overlie the collector rings 54 and 54a, depending upon whether the busses are associated with the field structure 22 or 22a. To each of these overlying portions of the busses 64 is secured a brush holder 72 carrying one or more brushes 74 which are resiliently urged against the respective collector rings with which they contact. Each of the brushes 74 is electrically connected with the brush holder 72 by means of a pigtail 76.

The common shaft 8 of the motor generator 1 comprises a section 8a which is magnetic in character having secured thereto as by bolts a lower end section 8b of nonmagnetic material and an upper end section 8c also of nonmagnetic material. The sections 8b and 8c may, for example, be aluminum bronze or stainless steel. The section 8c extends upwardly beyond the upper end bell 62 through the driving motor 4 and through the exciter 6 and terminates externally of the top of the common casing of the motor generator 1. The rotating member of the driving motor 4 is suitably secured to the shaft section 8c, so that when the driving motor 4 is energized it will rotate the common shaft 8, causing rotation of the rotating portions of the homopolar generator 2 and will also cause rotation of the rotor of the exciter 6. Preferably a three-phase alternating current motor is employed; however, any other type motor, whether alternating current or direct current, may be utilized. The exciter 6 may be any of the direct current generator types of proper rating whereby a direct current voltage across its output terminals will be produced in accordance with its speed of rotation and the degree of energization of its exciting winding as will be more thoroughly brought out hereinafter.

Referring now more specifically to Fig. 6, 150 designates an auto transformer having input terminals 152 and 154 adapted to be connected to a suitable source of alternating current energy for use in energizing the field winding 60 of the homopolar generator 2 and the exciting winding 156 of the exciter 6. Preferably the terminals 152 and 154 are connected across one phase of the three-phase power supply for the driving motor 4. An auto transformer 158 has its input terminals connected directly across the output terminals 160 and 162 of the auto transformer 150. A transformer 164 has the terminals of its primary winding 166 connected across the output terminals 160 and 162 of the auto transformer 150. The output terminals of the auto transformer 158 are connected across the alternating current input terminals of a full-wave bridge-type rectifier 168 having its direct-current output terminals connected directly across the exciting winding 156 of the exciter 6.

The secondary winding of the transformer 164 is connected across the alternating current input terminals of a full-wave bridge-type rectifier 170 which has its direct current output terminals arranged in series circuit with the output terminals of the exciter 6 and the field windings 60 of the homopolar generator 2. The voltage of the exciter 6 is arranged to be less than the voltage of the rectifier 170. The polarity of the output terminals of the exciter 6 and the direct-current output terminals of the full-wave rectifier 174 are preferably arranged in bucking relation so that the current flow through the field winding 60 will be proportional to the differential in voltage between that generated by the exciter 6 and that appearing across the direct-current output terminals of the full-wave bridge-type rectifier 170. It will now be evident that the voltage generated by the homopolar generator 2 will be a resultant of the rotational speed of the shaft 8 and of the differential in voltage between that generated by the exciter 6 and that appearing across the output terminals of the rectifier 170.

As the speed of rotation of the shaft 8 falls, the voltage generated by the exciter 6 will be reduced, thereby permitting a greater flow of current through the field winding 60 of the homopolar generator 2; and if the voltage characteristics of the exciter 6 with relation to speed of rotation of the shaft 8 are properly proportioned, this increase in excitation of the field winding 60 of the homopolar generator 2 due to the decreased terminal voltage of the exciter 6 will be sufficient so that the output voltage of the homopolar generator appearing between the conductor rings 66 and 68 will be substantially constant within any normal variable speed range of rotation of the shaft 8.

It is believed that the remaining details of construction may best be understood by reference to a description of operation of the motor generator 1 which is as follows:

Upon energization of the motor 4 by suitable means well known in the art and not shown herein for simplicity, the shaft 8 will be rotated at motor speed. Upon energization of the auto transformer 150 the exciting winding 156 of the exciter 6 will be energized through the auto transformer 158 and the rectifier 168 whereby a voltage will appear across the output terminals of the exciter 6. At the same time, a unidirectional voltage will appear across the output voltage terminals of the bridge rectifier 170, which voltage 170 is preferably balanced with respect to the normal output voltage of the exciter 6 so that it is enough greater than the output voltage of the exciter 6 to cause normal exciting current to flow through the field windings 60 of the homopolar generator 2. With the field windings 60 excited, flux will flow through the paths in the generator hereinbefore described and across the air gaps 24, 30, and 36 and similar air gaps 24a and 30a of the upper portion of the homopolar generator 2. This flux passes substantially radially across the gaps 30 and 30a and through the laminated cores 20 and 20a downwardly and upwardly through the shaft section 8a. It should be noted that since the end bells 40 and 49 and shaft sections 8b and 8c are of nonmagnetic material and will not conduct flux, the flux path will not extend through the bearings 38 and 50. Since the bearings 38 and 50 are completely insulated from the end bells 40 and 49 no current will pass therethrough due to any possible unbalance in voltage induced due to the cutting of the flux by the shaft section 8a.

As the shaft section 8a and the cores 20 and 20a rotate, this flux will be cut by the inductors 48, causing a voltage to be induced therein. Since the direction of cutting of the flux by the inductors 48 associated with the core 20 and the inductors 48 associated with the core 20a is in the same direction, the voltages induced by the cuttings of the flux passing across the gaps 30 and 30a will be additive. The upper collecting ring 54a will be of one polarity and the lower collector ring 54 will be of the opposite polarity. The collector rings are electrically connected by means of the associated brushes 74 to the respective sets of conductor busses 64 and therethrough to the conducting rings 66 and 68 which form the output terminals of the homopolar generator 2. The rings 66 and 68 may be connected by suitable conductors 172, 174 connected to welding electrodes diagrammatically shown at 176 and 178 between which the work W is clamped (see Fig. 7). A contactor 180 of a type available on the open market is connected in series with the conductor 172. A three-way valve 182 has its inlet connected to a suitable source of fluid pressure through conduit 184 and its outlet connected by a conduit 186 to the pressure chamber 188 of the valve 180. Energization of the control winding 190 of the valve 180 acts to connect the source of fluid pressure to the chamber 188 whereby the associated piston 192 will move downwardly, causing the cam 194 thereof to rotate the bell cranks 196 (one only being shown) whereby the carbon disks 198 and 200 are held in intimate contact for closing the circuit through the conductor 172.

Operation of the valve 182 is preferably controlled by any of the usual contactor controllers 202 which may be purchased on the open market. Such controllers, upon being actuated, will energize the circuit for the winding 190 for a predetermined time interval usually for a limited number of cycles of a sixty-cycle current source after which the winding 190 will be de-energized. Upon de-energization of the winding 190 the valve 182 will close the connection between conduits 184 and 186 and place conduit 186 in open communication with the exhaust conduit 204 whereby fluid pressure is relieved from the chamber 188 at a controlled rate as determined by a control valve 206 located in the conduit 204. As the fluid pressure escapes from the chamber 188 the piston will move upwardly allowing the bell cranks 196 to rotate clockwise and reduce the pressure at which the disk 198 engages the disk 200, thereby increasing the resistance to current flow therebetween and reducing the current flow through the conductor 172 to a value which preferably does not exceed 5% of the normal current flow during welding and in many instances to a value considerably below 5%. Continued reduction in pressure permits further clockwise rotation of the cranks 196, and the springs 208, one only of which is shown, will separate the disks 198 and 200 to interrupt the welding circuit through the conductor 172. By so arranging the contactor, current in the order of upwards of 100,000 amperes may be interrupted rapidly without destructive arcing between the disks 198 and 200, since the inductively stored energy of the system will be substantially dissipated before interruption at the disks 198 and 200.

When the contactor 180 controlling the energization of the welding electrodes 176, 178 is closed, whereby welding current is supplied thereto, the power required to effect the welds is somewhat greater than the power which may be transferred by the driving motor 4 to the shaft 8 so that the shaft 8 tends to reduce somewhat in speed. Due to the presence, however, of the flywheel 32 and the kinetic energy thereof, the shaft 8 will tend to rotate at a substantially constant speed until such time as energy is absorbed from the flywheel 32 when it slows down somewhat. However, due to the bucking arrangement of the exciting generator, such slow down of the shaft 8 will decrease the bucking voltage applied by the exciter 6 and thereby raise the energization of the exciting windings 60 of the homopolar generator 2 so that the voltage output generated by the homopolar generator 2 is maintained substantially constant whereby the potential supplied to the welding electrodes may be held substantially constant and a commercially satisfactory weld be effected between the workpieces W being joined.

What is claimed and is desired to be secured by United States Letters Patent is as follows:

1. In a motor generator apparatus, an electric motor, an electric generator having a greater power output than the power output of said motor and having a rotating part driven by said motor, a pair of electrical output terminals connected to be energized from said generator, a rotatable inertia device driven by said motor and arranged to supply rotating power to said generator as a function of a decreasing speed of said rotating part, said generator including an energizable winding normally supplied from a voltage source, and a voltage controlling means including an auxiliary electric potential generator connected between said voltage source and said energizable winding and polarized in opposite polarity to that of said voltage source actuated as a function of the speed of said generator for altering the voltage supplied to said terminals, said controlling means being effective to alter the degree of energization of said energizable winding.

2. A terminal assembly for a homopolar generator, including two field structures disposed in spaced end-to-end relation and a rotor common thereto, said assembly comprising a pair of disks disposed side-by-side between said field structure and surrounding said rotor, conductors extending axially of the stator from each disk and spaced circumferentially of the rotor, and yokes arcing over said rotor adjacent said disks.

3. A terminal assembly as defined by claim 2 characterized by said disk having lugs extending radially therefrom to which output leads are connected thereto.

4. A terminal assembly as defined by claim 2 characterized by said conductor having brush holder bars.

5. A terminal assembly as defined by claim 2 characterized by means mechanically securing together in insulating relation by the the generator yokes.

6. A motor generator apparatus for spot welding requiring short surges of heavy current between periods of no load operation comprising a direct current generator, a motor connected with the generator and powered to drive the generator at uniform normal speed when the generator is under no load, said generator and motor including a mass providing a fly wheel effect which is driven by the motor to provide kinetic energy to the generator to supplement the motor when it is operating under no load, said generator having an exciting winding, an auxiliary exciter for the generator driven by the motor having an energizing winding, a single source of electrical energy having branch circuits, circuit means connecting one of said branch circuits to said energizing winding, circuit means connecting the output voltage of said auxiliary exciter in bucking voltage relation with the second of said branch circuits and to said exciting winding whereby the voltage output of the generator will remain substantially unaffected by changes of speed of the generator during the period that it is supplying a surge of welding current.

7. A motor generator apparatus for spot welding requiring short surges of heavy current between periods of no load operation comprising a direct current generator, a motor connected with the generator and powered to drive the generator at uniform normal speed when the generator is under no load, said generator and motor including a mass providing a fly wheel effect which is driven by the motor to provide kinetic energy to the generator to supplement the motor when it is operating under no load, the generator having an exciting winding, an auxiliary exciter having a rotor and an energizing winding, said rotor being also driven by said motor, a source of alternating current energy having a pair of output circuits, one of said pair of output circuits being connected to the input terminals of a rectifier, which rectifier has its direct current output terminals connected to said energizing winding, the other of said pair of output circuits being connected to the current input terminals of a second rectifier, circuit means connecting the output of said auxiliary exciter in bucking relation with the output of said second rectifier and to said exciting winding of the generator.

8. In a terminal assembly for a homopolar generator including two field structures disposed in spaced end-to-end relation and a rotor common thereto, a pair of disks disposed side-by-side between said field structure and surrounding said rotor, and conductors extending axially of the stator from each disk and spaced circumferentially of the rotor.

9. The combination as defined in claim 8 wherein a lug extends radially from each of said disks for attachment of an output lead.

10. The combination as defined in claim 8 wherein brush holder bars are carried by said conductors.

11. The combination as defined in claim 8 wherein the homopolar generator is provided with a frame and means mechanically securing the disks together and to the frame in insulated relation.

References Cited in the file of this patent

UNITED STATES PATENTS

| | | |
|---|---|---|
| 731,581 | Leitner et al. | June 23, 1903 |
| 1,079,259 | Nehlsen | Nov. 18, 1913 |
| 1,335,141 | Turbayne | Mar. 30, 1920 |
| 1,476,978 | Jeffrey | Dec. 11, 1923 |
| 1,943,320 | Hyland | Jan. 16, 1934 |
| 2,311,462 | Neal | Feb. 16, 1943 |
| 2,431,252 | Hornbarger | Nov. 18, 1947 |

FOREIGN PATENTS

| | | |
|---|---|---|
| 472,796 | France | Dec. 17, 1914 |